(12) United States Patent
Dreps et al.

(10) Patent No.: US 7,230,449 B2
(45) Date of Patent: Jun. 12, 2007

(54) DATA RECEIVER WITH A PROGRAMMABLE REFERENCE VOLTAGE TO OPTIMIZE TIMING JITTER

(75) Inventors: Daniel M. Dreps, Georgetown, TX (US); Frank D. Ferraiolo, New Windsor, NY (US); Robert J. Reese, Austin, TX (US); Glen A. Wiedemeier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 11/055,805

(22) Filed: Feb. 11, 2005

(65) Prior Publication Data

US 2006/0181303 A1 Aug. 17, 2006

(51) Int. Cl.
*H03K 17/16* (2006.01)
*H04B 3/00* (2006.01)
*H04L 25/00* (2006.01)

(52) U.S. Cl. .............................. 326/30; 326/86; 326/29; 375/257

(58) Field of Classification Search ................... 326/30; 375/257, 318
See application file for complete search history.

(56) References Cited

U.S. PATENT DOCUMENTS

| 5,864,584 A * | 1/1999 | Cao et al. ................... 375/244 |
| 6,304,098 B1 * | 10/2001 | Drost et al. .................. 326/26 |
| 7,058,131 B2 * | 6/2006 | Dreps et al. ................ 375/257 |
| 2003/0086501 A1 * | 5/2003 | Dreps et al. ................ 375/257 |

\* cited by examiner

*Primary Examiner*—Vibol Tan
(74) *Attorney, Agent, or Firm*—Winstead PC

(57) ABSTRACT

Pseudo-differential drivers and receivers are used to communicate data signals between two or more IC chips. The data paths are aligned using programmable delay circuitry to de-skew each data path. A programmable reference generator is used to generate a reference voltage used by one or a group of receivers to detect the data signals. The reference voltage is adjustable using coarse as well as fine digitally controlled voltage increments. Test signals are sent from the driver to the receiver and the reference voltage is varied over its adjustable range using the coarse and fine adjustment controls while circuitry determines a measure of the detection timing jitter on successive transitions of the test signal. The operational value of the reference voltage is set to the value where the detection timing jitter is determined to be a minimum.

20 Claims, 6 Drawing Sheets

DATA RECEIVER WITH A PROGRAMMABLE REFERENCE VOLTAGE TO OPTIMIZE TIMING JITTER

TECHNICAL FIELD

The present invention relates in general to board level transmission line drivers and receivers, and in particular, to receiver circuits for shaping receiver transmission line signals.

BACKGROUND INFORMATION

Digital computer systems have a history of continually increasing the speed of the processors used in the system. As computer systems have migrated towards multiprocessor systems, sharing information between processors and memory systems has also generated a requirement for increased speed for the off-chip communication networks. Designers usually have more control over on-chip communication paths than for off-chip communication paths. Off-chip communication paths are longer, have higher noise, impedance mismatches, and have more discontinuities than on-chip communication paths. Since off-chip communication paths are of lower impedance, they require more current and thus more power to drive.

When using inter-chip high-speed signaling, noise and coupling between signal lines (crosstalk) affects signal quality. One way to alleviate the detrimental effects of noise and coupling is through the use of differential signaling. Differential signaling comprises sending a signal and its complement to a differential receiver. In this manner, noise and coupling affect both the signal and the complement equally. The differential receiver only senses the difference between the signal and its complement as the noise and coupling represent common mode signals. Therefore, differential signaling is resistant to the effects that noise and crosstalk have on signal quality. On the negative side, differential signaling increases pin count by a factor of two for each data line. The next best thing to differential signaling is pseudo-differential signaling. Pseudo-differential signaling comprises comparing a data signal to a reference voltage using a differential receiver or comparator.

When high speed data is transmitted between chips, the signal lines are characterized by their transmission line parameters. High speed signals are subject to reflections if the transmission lines are not terminated in an impedance that matches the transmission line characteristic impedance. Reflections may propagate back and forth between driver and receiver and reduce the margins when detecting signals at the receiver. Some form of termination is therefore usually required for all high speed signals to control overshoot, undershoot, and increase signal quality. Typically, a Thevenin's resistance (equivalent resistance of the Thevenin's network equals characteristic impedance of transmission line) is used to terminate data lines allowing the use of higher valued resistors. Additionally, the Thevenin's network is used to establish a bias voltage between the power supply rails. In this configuration, the data signals will then swing around this Thevenin's equivalent bias voltage. When this method is used to terminate data signal lines, a reference voltage is necessary to bias a differential receiver that operates as a pseudo-differential receiver to detect data signals in the presence of noise and crosstalk.

The logic levels of driver side signals are determined by the positive and ground voltage potentials of the driver power supply. If the driver power supply has voltage variations that are unregulated, then the logic one and logic zero levels of the driver side signals will undergo similar variations. If the receiver is substantially remote from the driver such that its power supply voltage may undergo different variations from the driver side power supply, then additional variations will be added to any signal received in a receiver side terminator (e.g., Thevenin's network). These power supply variations will reduce noise margins if the reference has variations different from those on the received signals caused by the driver and receiver side power supply variations.

When using pseudo-differential signaling for communication between integrated circuit (IC) chips, the accuracy of the reference compare level (Vref) tends to be one of the large limiting factors in extending this reduced power and area signaling method to the multi-Gigahertz frequency range. The variations in Vref due to process variations, package variations, and variations resulting from noise events, all contribute to tolerances that must be overcome by using a larger voltage swing. Reducing these tolerances may result in a pseudo-differential signaling bus design that may be used for signals in the 2–3 Gigahertz frequency range without resorting to larger signal swings and thus higher power and increased area.

There is, therefore, a need for circuitry implementing pseudo-differential signaling into the Gigahertz frequency range without increasing signal swings by optimizing the value of the reference voltage used in detecting signals at the receiver.

SUMMARY OF THE INVENTION

Embodiments of the present invention generate a variable Vref that is adjustable using fine and coarse voltage steps. The voltage steps are controlled using a state machine controller to find the maximum signal-to-noise ratio setting for an incident data signal by using the "eye" as the signal-to-noise metric. The "eye" is defined as the open area resulting between positive and negative transitions between a logic one and a logic zero of a large number of overlapping received signals. Registers are used to store the detected data at differing times around the transition points. The reference voltage is varied from the high to the low value while looking at the register values as a means of determining an amount of relative timing jitter relative to the "eye" of the received data. The optimum value for the reference voltage occurs when the timing jitter is determined to be at a minimum.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
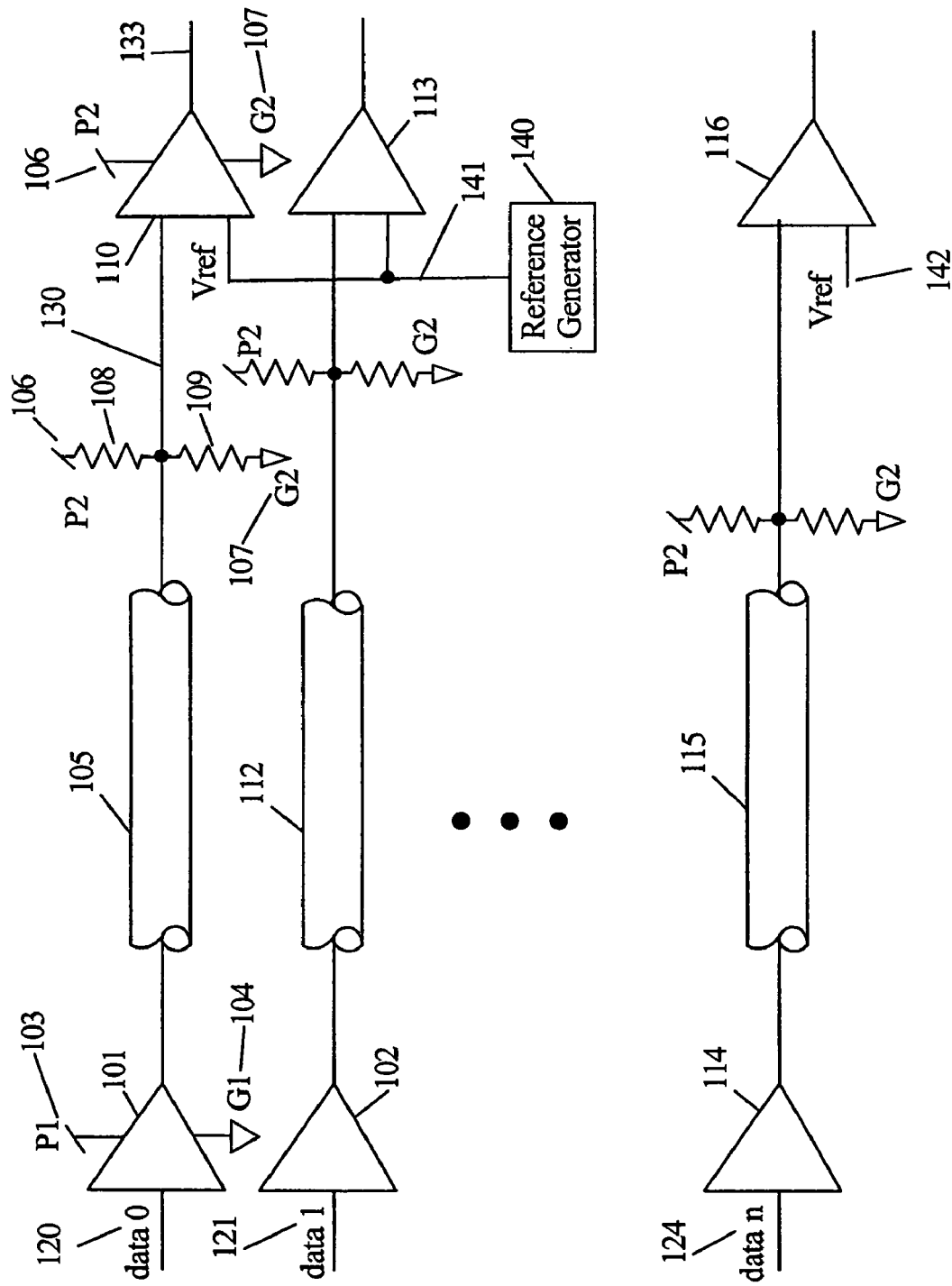
FIG. 1 is a circuit diagram of pseudo-differential signaling with receiver side reference voltage generation suitable for practicing embodiments of the present invention.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a circuit diagram of typical pseudo-differential signaling suitable for practicing embodiments of the present invention where data is transmitted from a driver to a receiver. Exemplary reference generator (RG) 140 may be used to generate a single reference voltage (e.g., Vref 141) for a receiver (e.g., 110) or multiple receivers (e.g., 113). Drivers 101, 102 and 114 represent three of a number of n drivers sending data to receivers 110, 113 and 116, respectively. Exemplary driver 101 receives data 0 120 and generates an output that swings between power supply rail voltages P1 103 (logic one) and G1 104 (logic zero). When the output of driver 101 is at P1 103, any noise on the power bus is coupled to transmission line 105 along with the logic state of the data signal 120. Exemplary transmission line 105 is terminated with a voltage divider comprising resistors 108 and 109. Receiver input 130 has a DC bias value determined by the voltage division ratio of resistors 108 and 109 and the voltage between P2 106 and G2 107. Receiver 110 is powered by voltages P2 106 and G2 107 which may have different values from P1 103 and G1 104 due to distribution losses, noise coupling, and dynamic impedance of the distribution network. Exemplary receiver 110 is typically a voltage comparator or high gain amplifier that amplifies the difference between a signal at input 130 and a reference voltage 141. In this circuitry, driver side noise will not be reduced by common mode rejection as the reference voltage (e.g., Vref 141) does not contain driver side noise, but rather reflects noise of the receiver side. Driver 116 is shown coupled to Vref 142 which may be the same as Vref 141 or may be generated with another reference generator (not shown).

Figure 2:
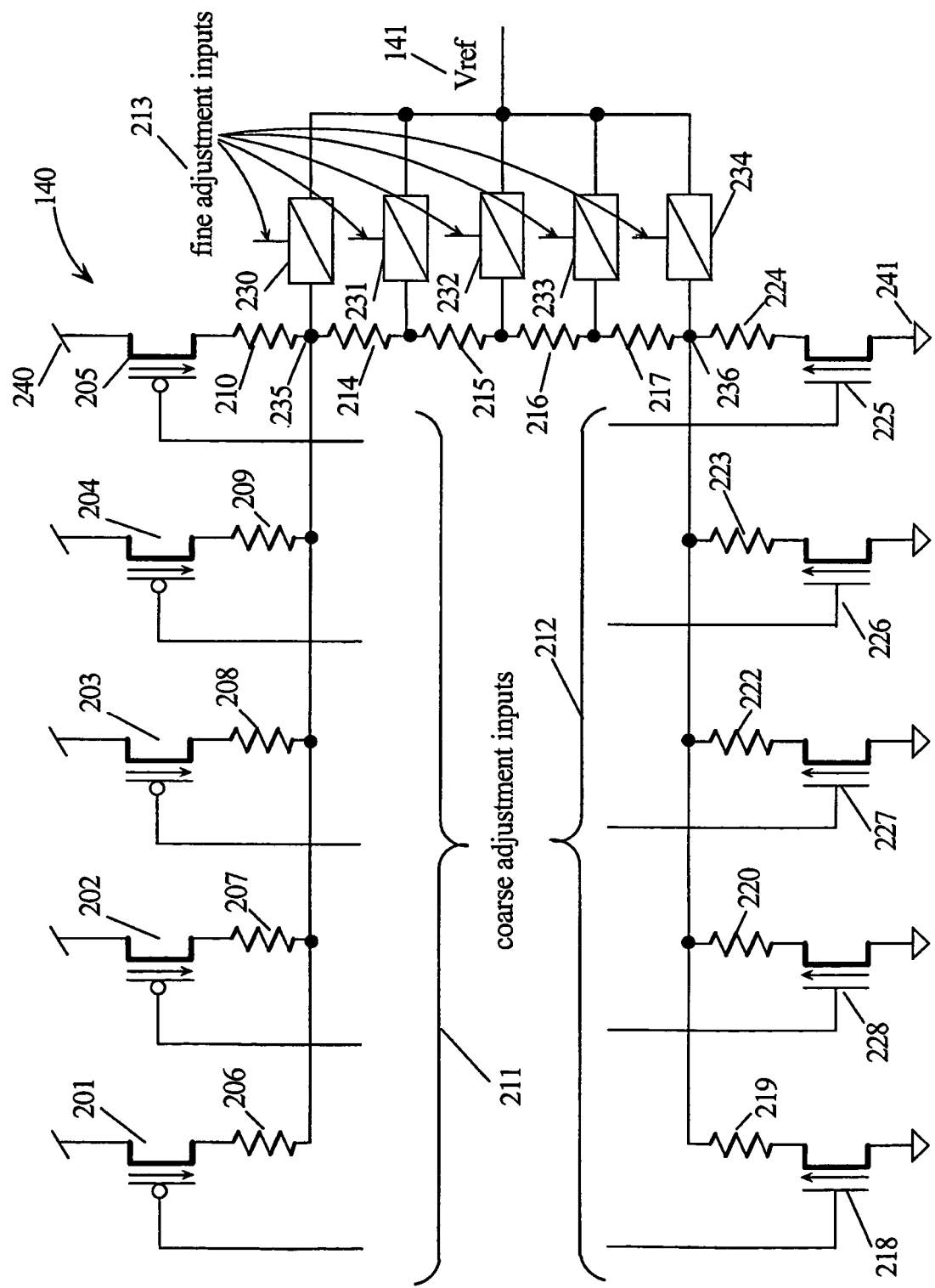
FIG. 2 is a circuit diagram of a programmable reference according to embodiments of the present invention.

FIG. 2 is a circuit diagram of a programmable reference voltage generator that may be used as RG 140 to implement pseudo-differential signaling according to embodiments of the present invention. RG 140 may be located on the driver side or the receiver side. RG 140 comprises voltage divider circuitry between the positive power supply potential 240 and the negative or ground power supply potential 241 and generates Vref 141 as a programmable reference voltage. P channel field effect transistors (PFETs) 201–205 and NFETs 219–224 are used to make coarse adjustments in Vref 141. PFETs 201–205 select parallel combinations of resistors 206–210 in response to control inputs 211 and NFETs 219–224 select parallel combinations of resistors 219–224 in response to control inputs 212. Lowering the value of the combination of resistors 206–210 increases the value of Vref 141. Likewise, lowering the value of the combination of resistors 219–224 decreases the value of Vref 141. The resistor network comprising resistors 214–217 forms nodes that may be selected to further refine the value of Vref 141. These taps allow a voltage value between or equal to the voltage on nodes 235 and 236 to be selected using the fine adjustment control inputs 213. Pass transistors 230–234 select the nodes along the resistor network formed by resistors 214–217. Coarse adjustment inputs 211 and 212 along with fine adjustment inputs 213 allow the voltage value of Vref 141 to be optimized. Vref 141 is optimized by monitoring a signal characteristic of a detected signal at a receiver output (e.g., output 133 in FIG. 1).

Figure 6:
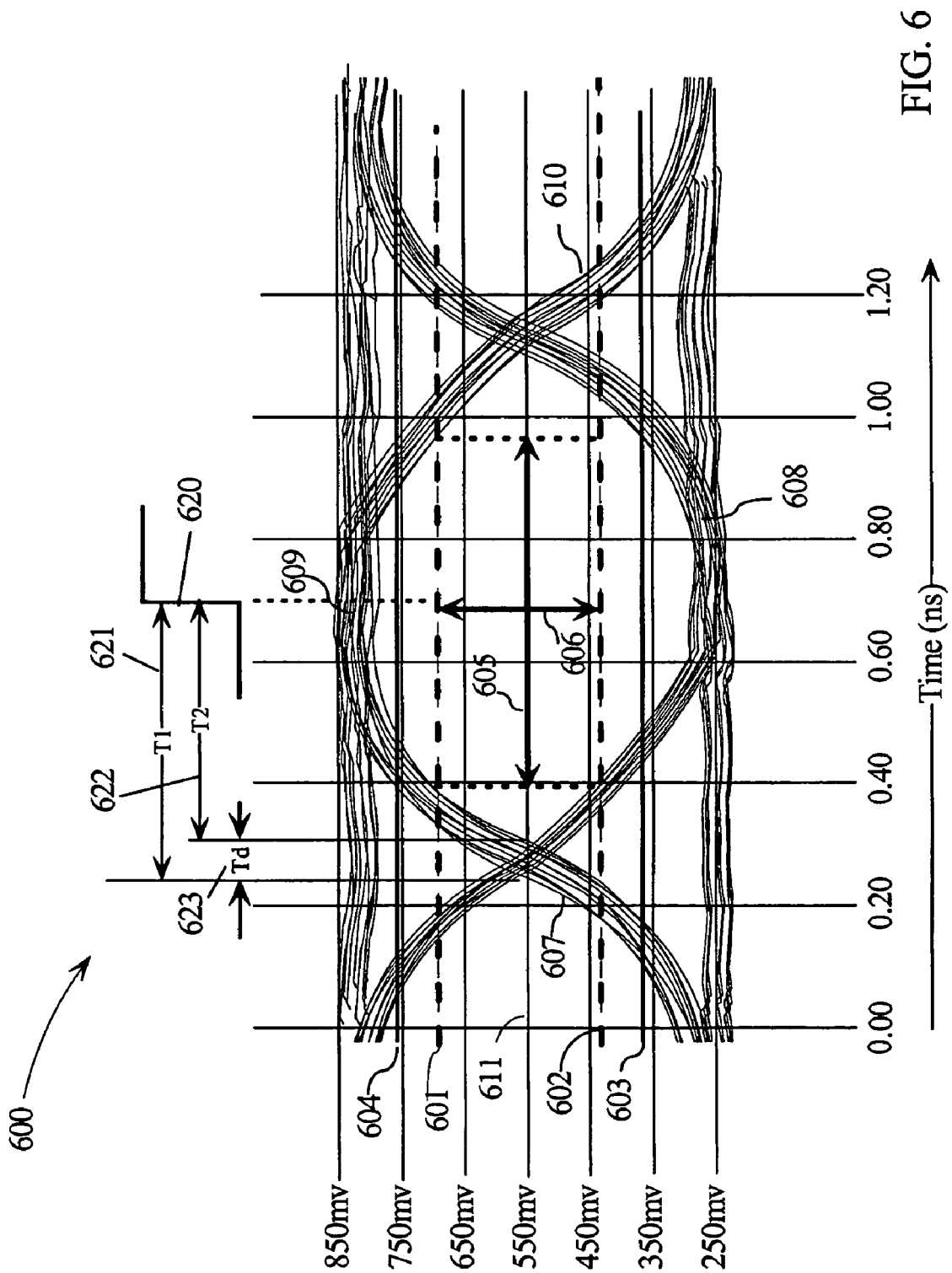
FIG. 6 illustrates a superposition of many received signals from a transmission line in accordance with an embodiment of the present invention.

Various signal characteristics may be monitored in determining what metric to use in setting an optimum value of a variable Vref 141. FIG. 6 illustrates a superposition of many received signals (e.g., at node 133) from a transmission line (TL) (e.g., TL 105). FIG. 6 defines what is meant by the "eye" of the waveforms as discussed in embodiments of the present invention. If one alternates between sending a repetitive signal and its complement, then a time lapse oscillograph of received waveforms would show that the waveform transitions between a logic one and a logic zero actually vary (e.g., positive transitions 607 and negative transitions 610). The actual voltage levels corresponding to a logic one (609) and a logic zero (608) also show dynamic variances. The voltage value of the "eye" is illustrated by arrow 606 between voltage levels 601 and 602 and the time value is illustrated by arrow 605 between the transitions at voltage levels 601 and 602. Voltage level 601 illustrates the voltage above where a received signal is defined as a logic one and level 602 illustrates the voltage below where a received signal is defined as a logic zero. The crossover point 611 (voltage 550 mv) may be an ideal threshold voltage for a receiver detecting waveforms 600. The voltage between 601 and 611 may be called the positive signal-to-noise margin and the voltage between 611 and 602 may be called the negative signal-to-noise margin. Noise margins may be one way to determine an optimum value to use to set a reference voltage (e.g., Vref 141) for detecting a pseudo-differential signal generated at a receiver output (e.g., 133 in FIG. 1).

When signals are transmitted over a transmission line, they undergo distortions that lead to variations in the transition path between particular logic states (e.g. logic one to a logic zero) that occur between successive transmissions of the same logic signal when measured relative to a logic state transition of a synchronous clock signal (e.g., clock transition 620). For example, successive particular positive logic state transition 607 has an earliest arrival time T1 621 (relative to clock transition 620) and a latest arrival time T2 622. The time difference T1 621 minus T2 622 is Td 623 which is a measure of the timing jitter relative to clock transition 620. In most applications it is desirable to have clock edge 620 occur in the middle of the data eye pattern defined by 605 and 606. Since a receiver amplifies the difference between a received signal and an applied reference voltage, the faster a received signal transitions through a given threshold voltage level (determined by the reference voltage), the less variation in detected signal transition timing is registered at the output of the receiver as timing jitter. Other transitions of the clock signal are not shown for simplicity.

Minimizing timing jitter on detected signals is an alternate method for setting an optimum value for Vref 141 according to embodiments of the present invention. For example, depending on where the value of Vref 141 is set between voltage values 601 and 602, a detected signal transition to a logic state at varying times depending on the transition path of a received signal (e.g., on node 130). A register (not shown) may be used to latch the states of a detected signal into register bits at variable times clock times around a nominal time, wherein the span of register bits registering a particular logic state over time represents a measure of timing jitter. Embodiments of the present invention use a programmable VG 140 to generate a variable Vref 141 while measuring timing jitter to determine an optimum Vref 141 to apply to receivers used in pseudo-differential signaling.

Figure 3:
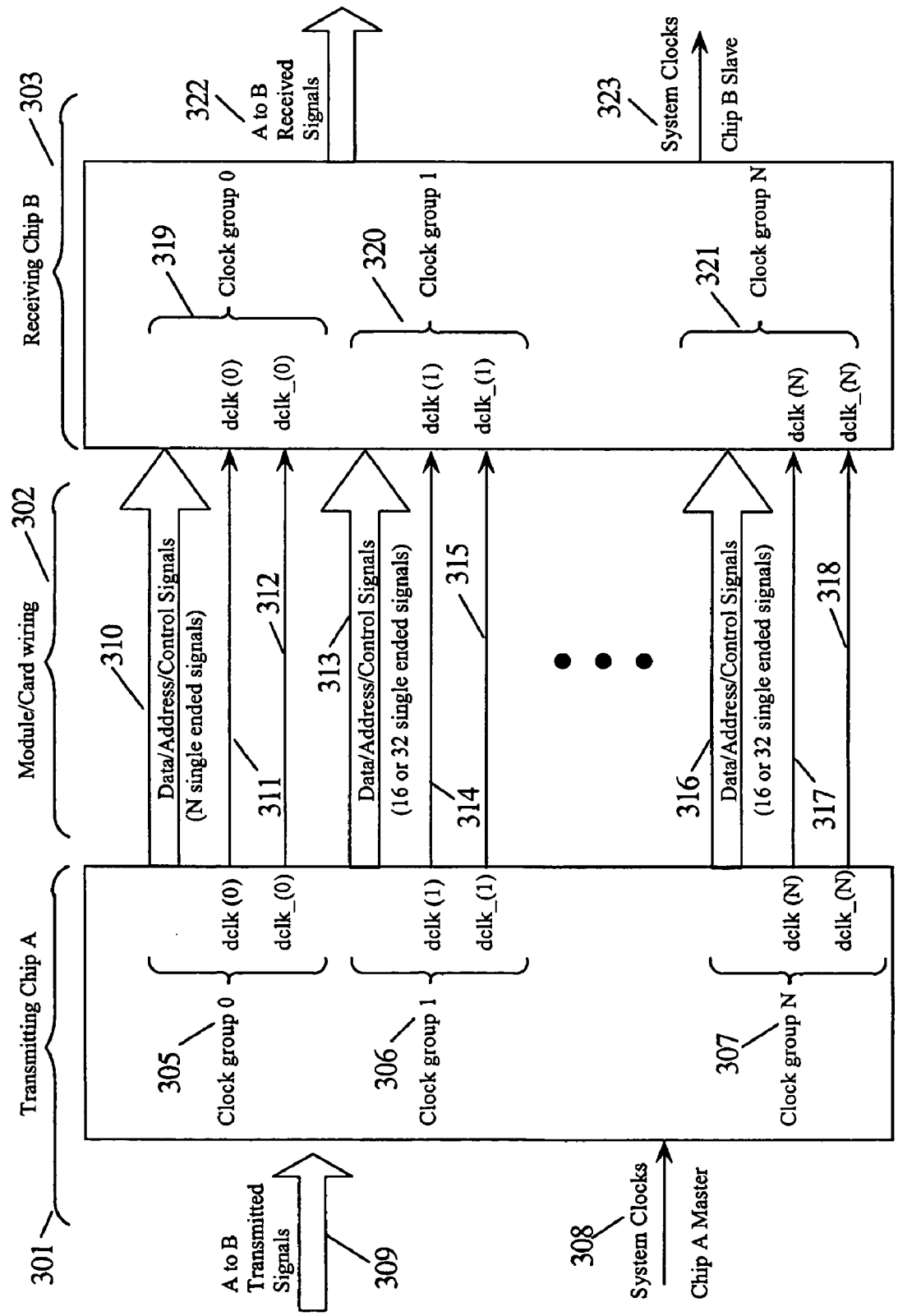
FIG. 3 is a system block diagram illustrating signal and clock distributions according to embodiments of the present invention.

FIG. 3 is a block diagram of signal and clock distribution between two chips using pseudo-differential signaling according to embodiments of the present invention. A transmitting integrated circuit (IC) chip A 301 receives signals 309 and system clocks 308 and transmits them over module/card wiring 302 to receiving IC chip B 303. Signals 309 are partitioned into "clock groups" in that a separate clock signal pair (clock signal and its complement) is sent with each signal group. Clock group 0 comprises Data/Address/Control Signals 310 and clock Dclk (0) 311 and Dclk_(0) 312. Clock group 1 comprises Data/Address/Control Signals 313 and clock Dclk (1) 314 and Dclk_(1) 315 and Clock group N comprises Data/Address/Control Signals 316 and clock Dclk (N) 317 and Dclk(N) 318. The signals and clocks in these groups are received in receivers (not shown) as Clock group 0 319-Clock group (N) 321 and are detected using a reference voltage (e.g., Vref 141) from a reference generator (e.g., RG 140) according to embodiments of the present invention to generate received signals 322 and system clocks 323. If a programmable RG 140 is used according to embodiments of the present invention, then a single reference voltage (e.g., Vref 141) may be optimized for a group of signals (e.g., Clock group 0) or each individual signal in a group may have an optimized reference voltage, where the optimum value of Vref 141 generates the least amount of timing jitter on detected signals (e.g., from within signals 322).

Figure 4:
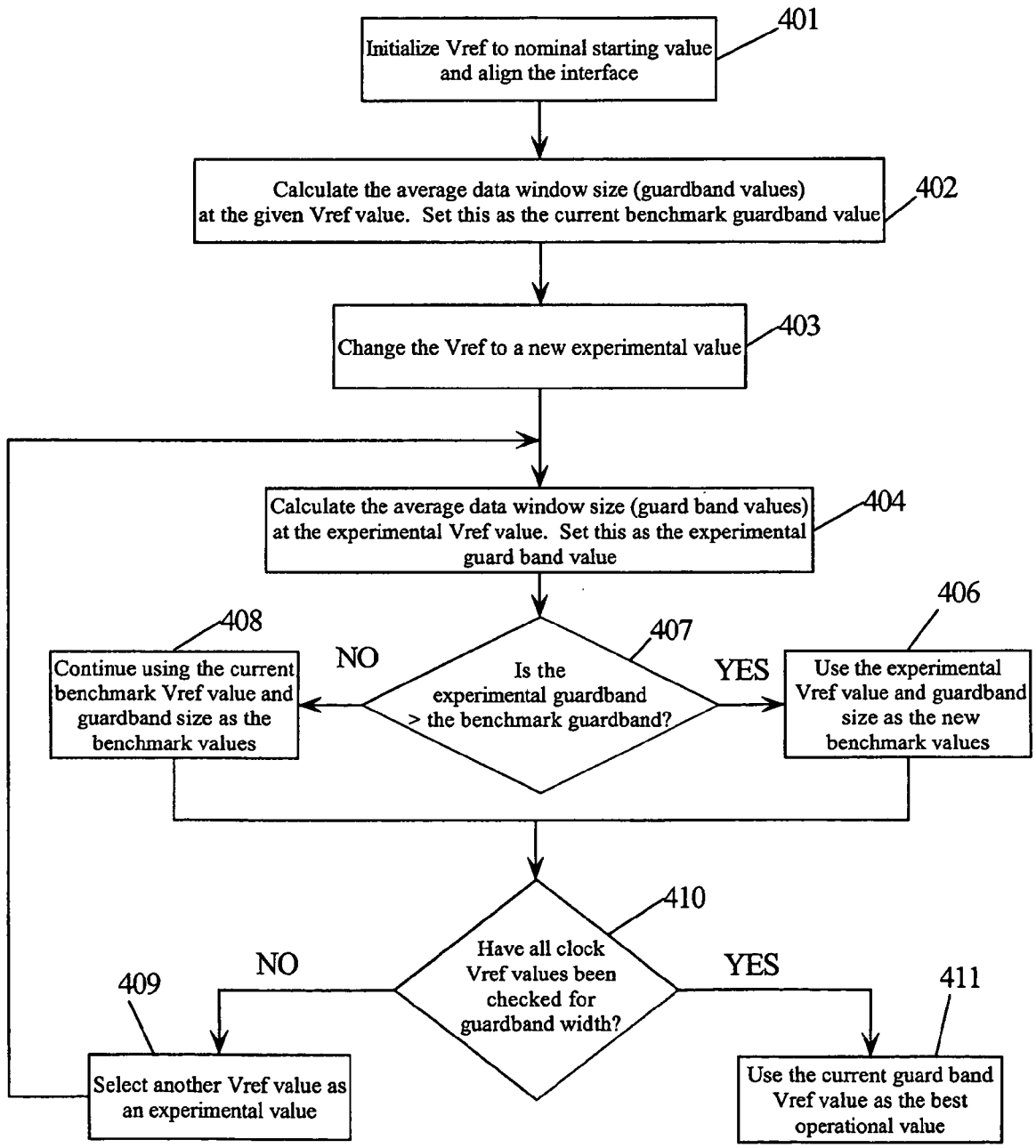
FIG. 4 is a flow diagram of method steps used in embodiments of the present invention.

FIG. 4 is a flow diagram of method steps used to adjust a reference voltage using a programmable reference generator (RG) 140 according to embodiments of the present invention. The method steps of FIG. 4 may be performed in receiving chip 303 (shown in FIG. 3) to optimize signal detection. In step 401, an initial value (Vref 141) is selected for the RG 140 and the interface is aligned. The interface is aligned by adjusting a programmable delay circuitry (not shown) in each data line so that data transitions of the test pattern are substantially aligned. In this manner, the bulk timing differences between data paths are eliminated. The signals and clocks in a group are detected using the initial value of Vref 141. In step 402, the average data window size (the guard band values), defining the earliest and latest a data bit transition is detected (timing jitter) is determined for data signals in a group using a particular Vref 141. The data window size is the width of the "eye" pattern, wherein a larger data window size indicates reduced timing jitter. This average data window size (for a group) is set as the current benchmark guard band value. In step 403, the adjustment controls (e.g., 211–213) are used to set a new experimental value for Vref 141. In step 404, the average of the guard band values (for the group) at the new Vref 141 value are calculated and set as the new or experimental guard band value. In step 407, a test is done to determine if the new experimental guard band value is greater than the benchmark guard band value. If the result of the test in 407 is NO, then the new Vref 141 has decreased the data window size and means that moving the reference value has increased the timing jitter. In this case, the current Vref 141 value and the guard band size are continued as the benchmark values. Then in step 410, another test is done to determine if all the possible Vref 141 values have been tested. If the result of the test in step 410 is NO, then in step 409 another Vref 141 value is selected as the experimental value and a branch is taken back to step 404 where the average data window size for a group is again calculated. If the result of the test in step 407 is YES, then in step 406 the new Vref 141 value and the guard band size are set as the benchmark values. Again, step 410 is executed. If the result of the test in step 410 is YES, then all the Vref 141 have been tested and the best value would have been determined. Then, in step 411 the current guard band and Vref value is used as the best operational value for the group. In other cases, each data line has its own RG 140 circuit and optimization is done on a per bit basis and averages need not be calculated.

Figure 5:
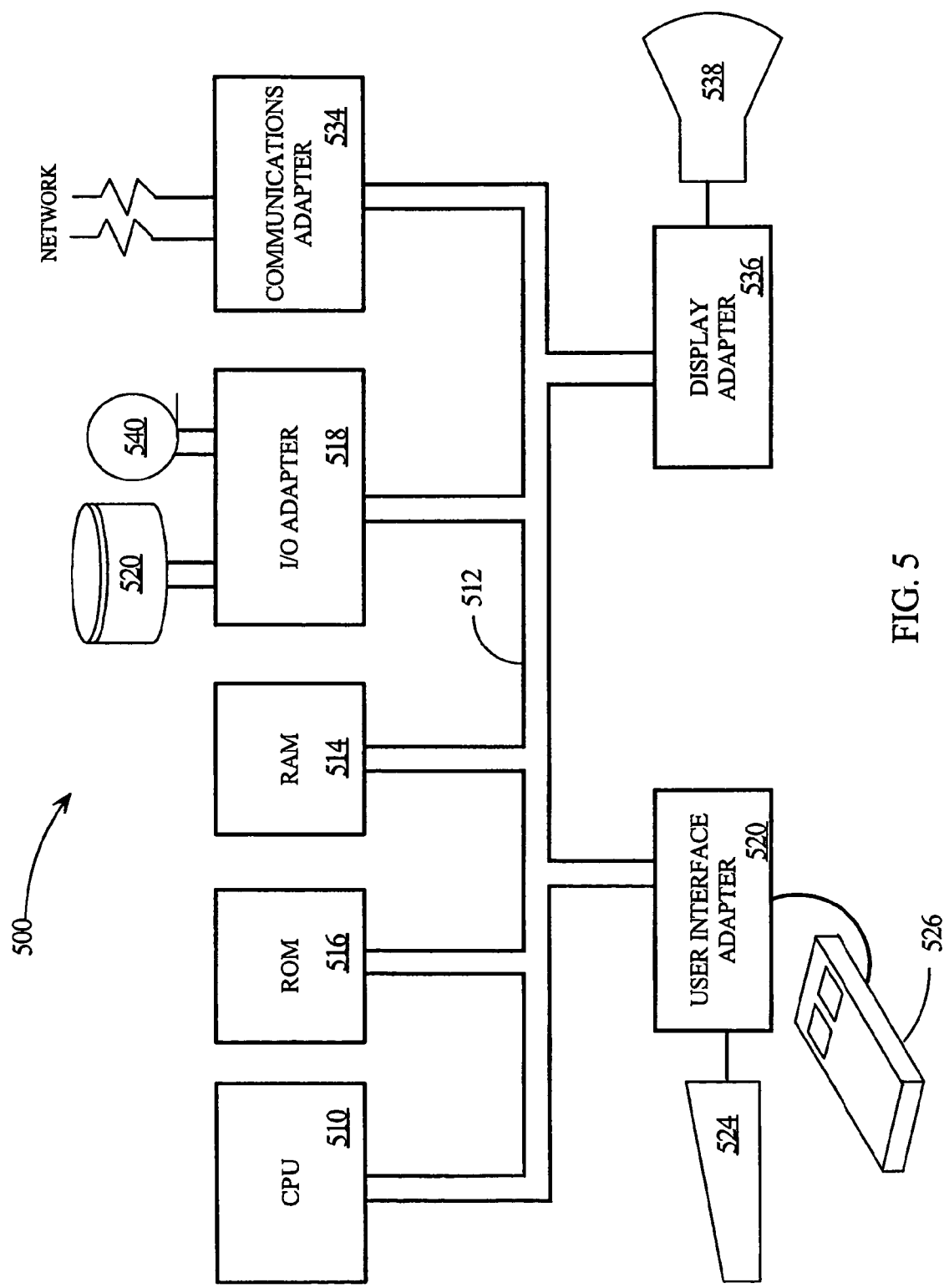
FIG. 5 is a block diagram of a data processing system suitable for practicing embodiments of the present invention.

FIG. 5 is a high level functional block diagram of a representative data processing system 500 suitable for practicing the principles of the present invention. Data processing system 500 includes a central processing system (CPU) 510 operating in conjunction with a system bus 512. System bus 512 operates in accordance with a standard bus protocol, such as the ISA protocol, compatible with CPU 510. CPU 510 operates in conjunction with electronically erasable programmable read-only memory (EEPROM) 516 and random access memory (RAM) 514. Among other things, EEPROM 516 supports storage of the Basic Input Output System (BIOS) data and recovery code. RAM 514 includes, DRAM (Dynamic Random Access Memory) system memory and SRAM (Static Random Access Memory) external cache. I/O Adapter 518 allows for an interconnection between the devices on system bus 512 and external peripherals, such as mass storage devices (e.g., a hard drive, floppy drive or CD/ROM drive), or a printer 540. A peripheral device 520 is, for example, coupled to a peripheral control interface (PCI) bus, and I/O adapter 518, therefore, may be a PCI bus bridge. User interface adapter 522 couples various user input devices, such as a keyboard 524 or mouse 526 to the processing devices on bus 512. Display 538 which may be, for example, a cathode ray tube (CRT), liquid crystal display (LCD) or similar conventional display units. Display adapter 536 may include, among other things, a conventional display controller and frame buffer memory. Data processing system 500 may be selectively coupled to a computer or telecommunications network 541 through communications adapter 534. Communications adapter 534 may include, for example, a modem for connection to a telecom network and/or hardware and software for connecting to a computer network such as a local area network (LAN) or a wide area network (WAN). CPU 510 and other components of data processing system 500 may contain logic circuitry in two or more integrated circuit chips that are separated by a significant distance relative to their communication frequency such that pseudo-differential signaling employing embodiments of the present invention is used to optimize signal timing jitter.

Although the present invention and its advantages have been described in detail, it should be understood that various changes, substitutions and alterations can be made herein without departing from the spirit and scope of the invention as defined by the appended claims.

What is claimed is:

1. A circuit for optimizing a logic signal generated by detecting a data signal transmitted over a transmission line comprising:
   a differential receiver having a first input coupled to an output of the transmission line, a second input coupled to a reference voltage, and an output generating the logic signal as the amplified difference between a voltage level of the data signal at the first input and a voltage level of the reference voltage at the second input;
   a programmable reference generator for generating the reference voltage in response to a plurality of logic control signals; and
   a logic controller receiving a clock signal, the logic signal and generating the plurality logic control signals, wherein the states of the plurality logic control signals are adjusted to minimize a time difference between earliest and latest occurrences of successive, particular logic state transitions of the logic signal relative to a state transition of the clock signal.

2. The circuit of claim 1, wherein the programmable reference generator comprises a first reference node coupled to a first voltage potential of a power supply with a first resistance in response to positive coarse control signals, a second reference node coupled to a second voltage potential of a power supply with a second resistance in response to negative coarse control signals, and a series network of third resistors coupled between the first and second nodes and forming a plurality of fine control nodes one of which is selectively coupled to an output node in response to a plurality of fine control signals within the logic control signals thereby generating the reference voltage.

3. The circuit of claim 2, wherein the first resistance is the parallel combination of a first plurality of resistors each having a first resistor node coupled to the first reference node and a second resistor node coupled to the first voltage potential of the power supply with a first electronic switch in response to a first one of the positive coarse control signals within the logic control signals.

4. The circuit of claim 3, wherein the second resistance is the parallel combination of a second plurality of resistors each having a first resistor node coupled to the second reference node and a second resistor node coupled to the second voltage potential of the power supply with a second electronic switch in response to first one of the negative coarse control signals within the logic control signals.

5. The circuit of claim 4, wherein each of the fine control nodes is coupled to the output node with a third electronic switch in response to one of the fine control signals.

6. The circuit of claim 5, wherein the first electronic switch is a P channel field effect transistor (PFET) having source terminal coupled to the first voltage potential of the power supply, a drain terminal coupled to the second resistor node of a one of the first resistors and a gate terminal coupled to the first one of the positive coarse control signals.

7. The circuit of claim 5, wherein the second electronic switch is an N channel field effect transistor (NFET) having source terminal coupled to the second voltage potential of the power supply, a drain terminal coupled to the second resistor node of one of the second resistors and a gate terminal coupled to the first one of the positive coarse control signals.

8. The circuit of claim 5, wherein the third electronic switch is a series pass transistor having an input terminal coupled to one of the fine control nodes, an output terminal coupled to the output node and a gate input coupled to one of the fine control signals.

9. The circuit of claim 2, wherein the first and second nodes are one of the fine control nodes.

10. A data processing system comprising:
    a processor central processing unit (CPU);
    a random access memory (RAM);
    a read only memory (ROM); and
    a bus system coupling the CPU to the ROM and the RAM, wherein the data processing system contains two or more integrated circuits that communicate using receiving circuitry for optimizing a logic signal generated by detecting a data signal transmitted over a transmission line, the receiving circuitry having a differential receiver with a first input coupled to an output of the transmission line, a second input coupled to a reference voltage, and an output generating the logic signal as the amplified difference between a voltage level of the data signal at the first input and a voltage level of the reference voltage at the second input, a programmable reference generator for generating a the reference voltage in response to a plurality of logic control signals, and a logic controller receiving a clock signal, the logic signal and generating the plurality logic control signals, wherein the states of the plurality logic control signals are adjusted to minimize a time difference between earliest and latest occurrences of successive, particular logic state transitions of the logic signal relative to a state transition of the clock signal.

11. The data processing system of claim 10, wherein the programmable reference generator comprises a first reference node coupled to a first voltage potential of a power supply with a first resistance in response to positive coarse control signals, a second reference node coupled to a second voltage potential of a power supply with a second resistance in response to negative coarse control signals, and a series network of third resistors coupled between the first and second nodes and forming a plurality of fine control nodes one of which is selectively coupled to an output node in response to a plurality of fine control signals within the logic control signals thereby generating the reference voltage.

12. The data processing system of claim 11, wherein the first resistance is the parallel combination of a plurality of first resistors each having a first resistor node coupled to the first reference node and a second resistor node coupled to the first voltage potential of the power supply with a first electronic switch in response to a first one of the positive coarse control signals within the logic control signals.

13. The data processing system of claim 12, wherein the second resistance is the parallel combination of a plurality of second resistors each having a first resistor node coupled to the second reference node and a second resistor node coupled to the second voltage potential of the power supply with a second electronic switch in response to a first one of the negative coarse control signals within the logic control signals.

14. The data processing system of claim 13, wherein each of the fine control nodes is coupled to the output node with a third electronic switch in response to one of the fine control signals.

15. The data processing system of claim 14, wherein the first electronic switch is a P channel field effect transistor (PFET) having a source terminal coupled to the first voltage potential of the power supply, a drain terminal coupled to the second resistor node of a one of the first resistors and a gate terminal coupled to the first one of the positive coarse control signals.

16. The data processing system of claim 14, wherein the second electronic switch is an N channel field effect transistor (NFET) having source terminal coupled to the second voltage potential of the power supply, a drain terminal coupled to the second resistor node of one of the second resistors and a gate terminal coupled to the first one of the positive coarse control signals.

17. The data processing system of claim 14, wherein the third electronic switch is a series pass transistor having an input terminal coupled to one of the fine control nodes, an output terminal coupled to the output node and a gate input coupled to one of the fine control signals.

18. A method for optimizing a logic signal generated by detecting a data signal transmitted over a transmission line, comprising the steps of:
- a) receiving the data signal at a first input of a differential receiver having a second input coupled to a reference voltage, and an output generating the logic signal as the amplified difference between voltage levels of the data signal at the first input and an operational voltage value of the reference voltage at the second input;
- b) generating a present voltage value for the reference voltage with a programmable reference generator in response to a plurality of logic control signals;
- c) sending a repetitive test signal as the data signal from a communicating line driver coupled to the input of the transmission line;
- d) determining the timing variations of successive transitions of the repetitive test signal setting a present data window size, wherein minimum timing variations indicate a maximum data window size;
- e) changing the present voltage value of the reference voltage to a new voltage value by changing logic states of the plurality of logic control signals thereby generating a new data window size;
- f) comparing the new data window size to the present data window size;
- g) using the new voltage value as the present voltage value if the new data window size is greater than the present data window size and keeping the present voltage value unchanged if the new data window size is less than the present data window size;
- h) determining if all voltage values of the reference voltage enabled by possible combinations of the logic control signals, have been tried; and
- i) repeating from step d) if all voltage values have not been tried and using the present voltage value of the reference voltage as the operational value if all the voltage values have been tried, wherein the voltage value selected as the operational value minimizes the time difference between the earliest and latest occurrences of successive, particular logic state transitions of the logic signal relative to a state transition of the clock signal.

19. The method of claim 18, wherein the programmable reference generator comprises a first reference node coupled to a first voltage potential of a power supply with a first resistance in response to positive coarse control signals, a second reference node coupled to a second voltage potential of a power supply with a second resistance in response to negative coarse control signals, and a series network of third resistors coupled between the first and second nodes and forming a plurality of fine control nodes one of which is selectively coupled to an output node in response to a plurality of fine control signals within the logic control signals thereby generating the reference voltage.

20. The method of claim 19, wherein the first resistance is the parallel combination of a first plurality of resistors each having a first resistor node coupled to the first reference node and a second resistor node coupled to the first voltage potential of the power supply with a first electronic switch in response to a first one of the positive coarse control signals within the logic control signals.

* * * * *